No. 696,125. Patented Mar. 25, 1902.
L. E. WHITAKER.
CLOTH OR SPONGE HOLDER.
(Application filed July 25, 1901.)
(No Model.)
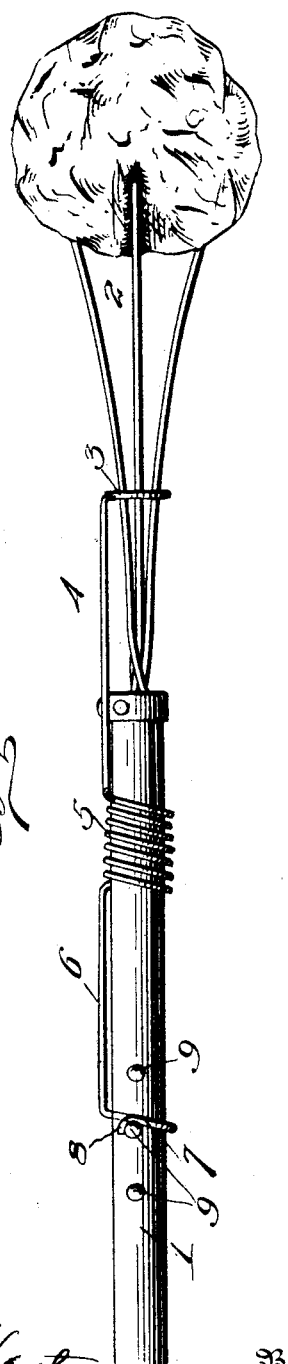
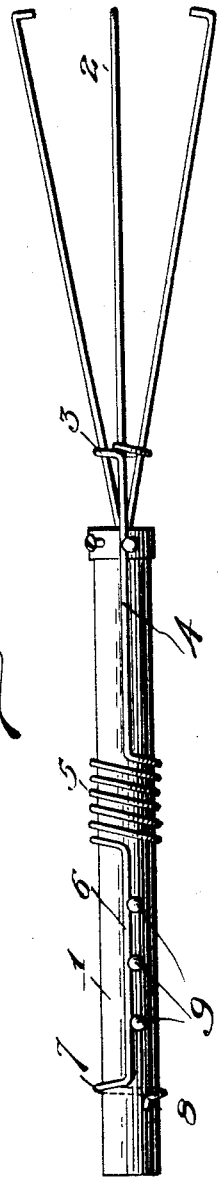
Witnesses
Inventor
L. E. Whitaker
By H. B. Willson & Co.
Attorneys

UNITED STATES PATENT OFFICE.

LEWIS E. WHITAKER, OF SUSSEX, NEW JERSEY.

CLOTH OR SPONGE HOLDER.

SPECIFICATION forming part of Letters Patent No. 696,125, dated March 25, 1902.

Application filed July 25, 1901. Serial No. 69,684. (No model.)

*To all whom it may concern:*

Be it known that I, LEWIS E. WHITAKER, a citizen of the United States, residing at Sussex, in the county of Sussex and State of New Jersey, have invented certain new and useful Improvements in Cloth or Sponge Holders; and I do declare the following to be a full, clear, and exact description of the invention, such as will enable others skilled in the art to which it appertains to make and use the same.

The invention relates to a cloth or sponge holder, the device being intended for use about the house for removing dust and cobwebs, and it may be used for light floor-mopping.

The object of the invention is to provide a device of this character which shall be simple of construction, durable in use, and comparatively inexpensive of production, and by means of which sponges, cloth mops or brushes may be easily and quickly attached and securely held in position while in use.

With this and other objects in view the invention consists of certain novel features of construction, combination, and arrangement of parts, which will be hereinafter more fully described, and particularly pointed out in the appended claims.

In the accompanying drawings, Figure 1 is a side elevation of the holder, showing a sponge clamped or held in position; and Fig. 2 is a top plan view showing the sleeve moved inward and the prongs spread apart.

In the drawings, 1 denotes a stick or handle, which may be made in one or more sections and of suitable length, and 2 denotes the claws or jaws, which are preferably constructed of spring metal and have their inner ends twisted together and secured in the stick or handle. The normal position of the jaws is shown in Fig. 2 spread apart, in which position they are held by the resiliency of the metal of which they are constructed.

The sponge, brush, or cloth mop is adapted to be secured between these claws or jaws and held in place. The means employed for effecting this consists of a slide 3, which is preferably in the form of a ring and encompasses the claws or jaws. This slide is connected by a rod 4 to a sleeve 5, preferably formed of a coiled spring, which encompasses the stick or handle and has a sliding engagement thereon. When the sleeve is slid outwardly to compress the spring jaws or claws to the article to be held between them, means are provided whereby the sleeve is locked in its adjusted position, and in the present case these means comprise the rod 6, which extends inwardly from the spring and is preferably formed of the same wire of which the spring is composed and has at its inner end a loop or bail 7, which is bent partly around the stick or handle and has its end formed with a hook or catch 8, which is adapted to engage one of a longitudinal row of studs 9, secured to the handle and by means of which the sleeve is locked in adjusted position. Between the hook at the end of the bail and the straight portion of the rod 6 is an intervening space, so as to permit the bail to be slipped back and forth along the stick or handle past the studs.

In operation, assuming the sponge to be placed between the claws or jaws and it be desired to clamp it in position, the stick is grasped with one hand, and the other hand is used to slide the sleeve outwardly, and when the sponge is firmly clamped by the claws or jaws the sleeve is given a slight axial turn or twist, which engages the hook with one of the studs, and owing to the resiliency of the sleeve, the coils of which have been compressed in the act of forcing the slide outwardly, the hook is forced inward and held by spring action firmly in engagement with the stud with which it coacts, so as to reduce to a minimum the liability of the hook becoming accidentally disengaged. To remove the sponge, the sleeve is first moved slightly outward to free the hook from the stud and then slid inwardly, thus moving the slide in the same direction and allowing the spring jaws or claws to spread apart. To limit the rotation of the sleeve, so that the hook carried thereby may always be in proper position for action, I provide studs located at the outer end of the stick or handle and in the path of movement of the rod 4.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a stick or handle, of spring claws or jaws carried thereby, a slide for compressing said jaws, a sleeve connected to the slide, and means for locking the sleeve to the handle, substantially as set forth.

2. The combination with a stick or handle, of spring claws or jaws carried thereby, a slide for compressing said jaws, a sleeve connected to the slide, and means for locking the sleeve to the handle, said means consisting of a hook carried by an extension to said sleeve and studs carried by the handle, substantially as set forth.

3. The combination with a stick or handle, of spring claws or jaws carried thereby, a slide for compressing said claws, a sleeve mounted to slide upon the handle and consisting of a coiled spring connected to said slide, a hook carried by said sleeve, and studs carried by said handle to be engaged by said hook and held in place by the spring action of the coils, substantially as set forth.

4. The combination with a stick or handle, of spring claws or jaws carried thereby, a slide for compressing said claws, a sleeve mounted to slide upon the handle and consisting of a coiled spring connected to said slide, a hook carried by said sleeve, and studs carried by said handle to be engaged by said hook and held in place by the spring action of the coils, and studs for limiting the rotation of the sleeve, substantially as set forth.

In testimony whereof I have hereunto set my hand in presence of two subscribing witnesses.

LEWIS E. WHITAKER.

Witnesses:
IRVIN D. SHORTER,
AMZI E. WOLFE.